Dec. 12, 1967 P. HILLMANN 3,357,778
CINEMATOGRAPHIC CAMERAS HAVING AN OBLIQUE
RECIPROCATING SHUTTER
Filed Aug. 2, 1965
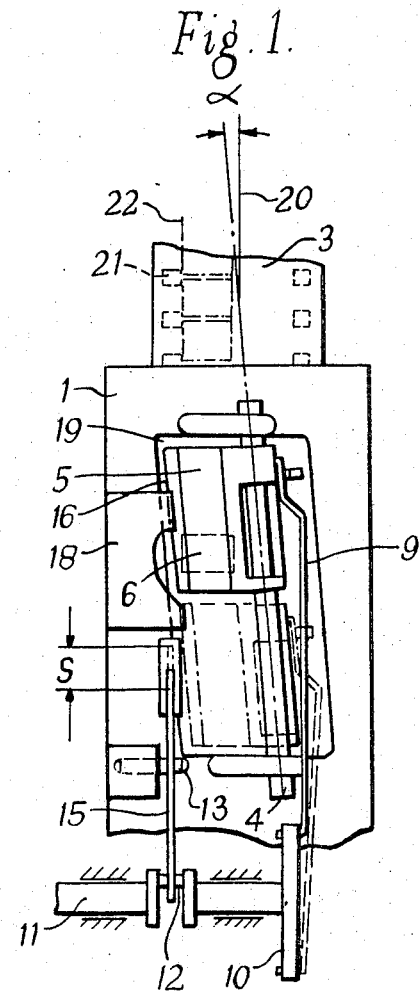
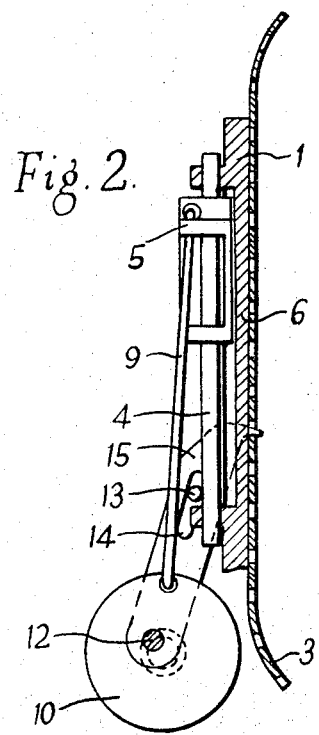
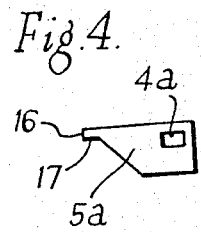
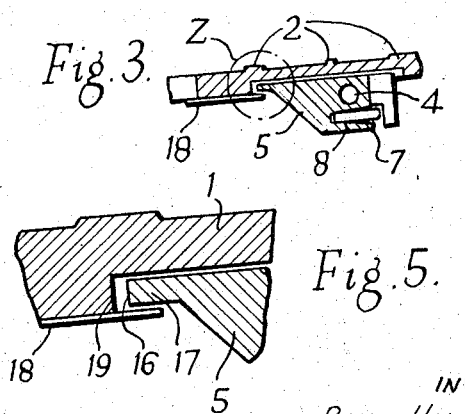
INVENTOR
PAUL HILLMANN
BY Young & Thompson
ATTORNEYS United States Patent Office 3,357,778
Patented Dec. 12, 1967

3,357,778
CINEMATOGRAPHIC CAMERAS HAVING AN OBLIQUE RECIPROCATING SHUTTER
Paul Hillmann, Dresden, Germany, assignor to Veb Pentacon Dresden Kamera- und Kinowerke, Dresden, Germany
Filed Aug. 2, 1965, Ser. No. 476,428
6 Claims. (Cl. 352—207)

The invention relates to a cine-camera, particularly a narrow-gauge camera, with a shutter slide which moves to and fro and with a film transport claw of which the range of oscillation in the direction taken by the film is staggered in respect of the gate.

To enable the claw drive to be utilised for actuating the shutter slide as well, and also to enable the height of the smaller gate extension to serve as the "lift magnitude" of the shutter slide, and last but not least for reasons of space, the shutter slide of known cine-cameras of the type mentioned at the beginning is moved parallel to the direction taken by the film. Owing to the small distance between the oscillation plane of the claw and that edge of the gate which faces towards the said plane, it is difficult to ensure that during each film transport step the gate will be covered over in such a way as to preclude the ingress of any light, difficulties also arising in connection with the interaction between shutter slide and claw. It is only within certain limits that the adoption of the measures already known enables light to be excluded as required and the necessary functional interaction to be obtained, and they necessitate components of complicated construction and increase the expense involved in the assembly of the apparatus.

The purpose of the invention is to avoid the above drawbacks by a novel kind of shutter slide system.

In the invention this object is achieved by a system in which the shutter slide is caused to move in a direction oblique to that taken by the film, so that that edge of the shutter slide which faces towards the claw intersects the oscillation plane of the claw between the oscillation range of the claw and the gate. This method enables the advantages mentioned at the beginning to be utilised, ensures the exclusion of light and enables the shutter slide and the claw to interact as required. The shutter slide can be suitably guided by a profiled bar. If, in accordance with a particular characteristic of the invention, the shutter-slide is also provided with a guide plate forming a guide groove, then the profiled bar can be given a circular cross-section. A simple gearing system is obtained if the shutter-slide is connected with the eccentric disc of the driving shaft, via a coupling rod, which is Cardanically mounted both on the shutter-slide and on the eccentric disc; the cylindrical end of the coupling rod preferably extends into a conical boring of the shutter-slide. The details of the invention may be seen from an example now illustrated and described.

In the drawings:

FIG. 1 shows how the shutter-slide is mounted obliquely;

FIG. 2 is a lateral view corresponding to FIG. 1;

FIG. 3 is a cross-section corresponding to FIG. 1;

FIG. 4 is a further possible constructional version of the profiled bar;

FIG. 5 is a detailed diagram corresponding to point Z.

In a camera housing not showing separately, is mounted the image carrier 1, of which the back is provided with guide ribs for a film 3, and which has a gate 6. On the front of the image carrier 1 is provided a profiled bar 4 which is inclined at an angle in respect of the direction 20 in which the film moves and on which the shutter slide 5 is guided. The cylindrical end 8 of a coupling rod 9, of which the other end is connected with the eccentric disc 10 of a driving shaft 11, extends into a conical boring 7 of the shutter-slide 5; the connection of the coupling 9 both in the shutter-slide 5 and which with the eccentric disc 10 takes the form of a universal joint. The driving shaft 11 has the further eccentric disc 12, on which is mounted the claw 15, guided by a pin 13 and a slot 14. On the edge 16, facing towards the claw 15, the shutter slide 5 has a guide-bar 17 which moves in a guide groove 19 formed between the front of the image carrier 1 and a guide plate 18.

If the cross-section of the profile bar 4a is rectangular and a shutter slide 5a (of FIG. 4) is adapted to this cross-section, the adidtional system of guiding devices 17, 18 and 19 can be dispensed with.

Owing to the profiled bar 4 or 4a, inclined at an angle in respect of the direction 20 in which the film moves, that edge 16 of the shutter-slide 5 or 5a which faces towards the claw 15 interesects the oscillation plane of the claw 15 between the oscillation range of S of claw 15 and the gate 6. This ensures that the gate 6 will be fully covered during each transport step and that the shutter slide 4 or 4a and the claw 15 will reliably interact as required by their functions.

I claim:

1. A cine camera having a reciprocating shutter-slide and with a film transport claw of which the oscillation range in the direction taken by the film is staggered in respect of the gate, wherein the shutter slide is mounted and guided obliquely in respect of the direction taken by the film, so that that edge of the shutter slide which faces towards the claw intersects the oscillation plane of the claw between the oscillation range of the claw and the gate.

2. A cine camera in accordance with claim 1, wherein the shutter slide is guided on a profiled bar.

3. A cine camera in accordance with claim 2, wherein the shutter slide is provided with a guide bar, which moves in a guide groove.

4. A cine camera in accordance with claim 3, wherein the guide groove is delimited by a guide plate.

5. A cine camera in accordance with claim 1, wherein the shutter slide is operatively connected with the eccentric disc of a driving shaft, via a coupling rod, which is mounted both on the shutter side and on the eccentric disc.

6. A cine camera in accordance with claim 5, wherein the cylindrical end of the coupling rod extends into a conical boring of the shutter-slide.

References Cited

UNITED STATES PATENTS

| 1,188,074 | 6/1916 | Hochsetter | 352—207 X |
| 1,540,902 | 6/1925 | Rogers | 352—114 |
| 1,808,566 | 6/1931 | Merle | 352—192 |
| 3,208,078 | 9/1965 | Koeber | 352—207 |

NORTON ANSHER, Primary Examiner.

M. H. HAYES, Assistant Examiner.